Nov. 12, 1968   U. J. SCHMIDT   3,410,624
THREE DIMENSIONAL LIGHT BEAM SCANNER
Original Filed Oct. 17, 1963                2 Sheets-Sheet 1

UWE J. SCHMIDT
INVENTOR.

BY Allen M. Sutton
ATTORNEY

Nov. 12, 1968   U. J. SCHMIDT   3,410,624
THREE DIMENSIONAL LIGHT BEAM SCANNER
Original Filed Oct. 17, 1963   2 Sheets-Sheet 2
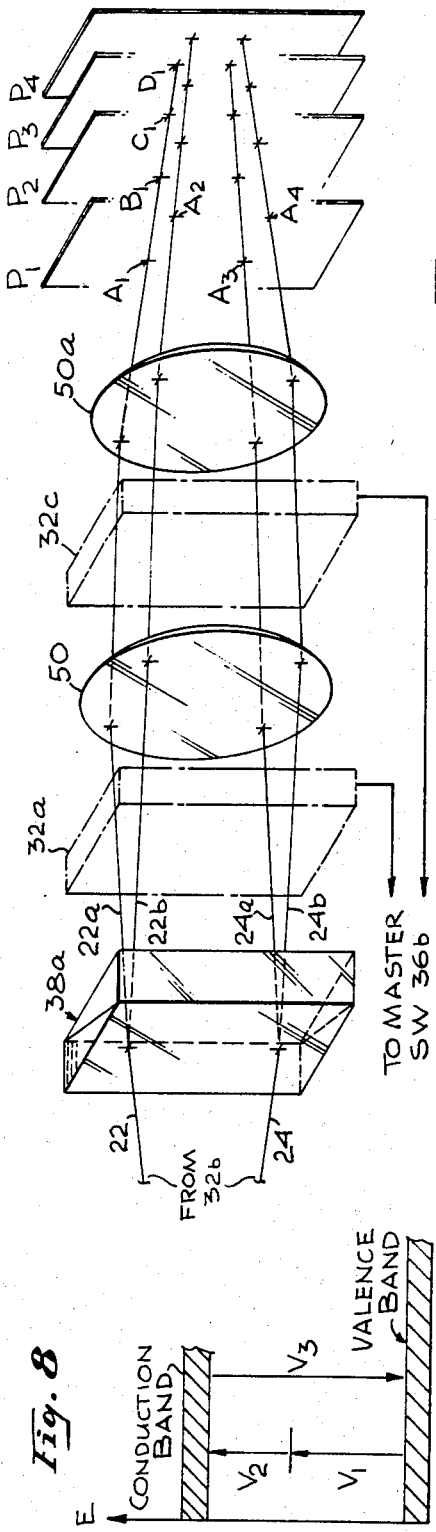
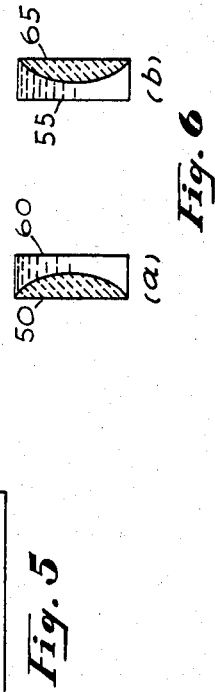
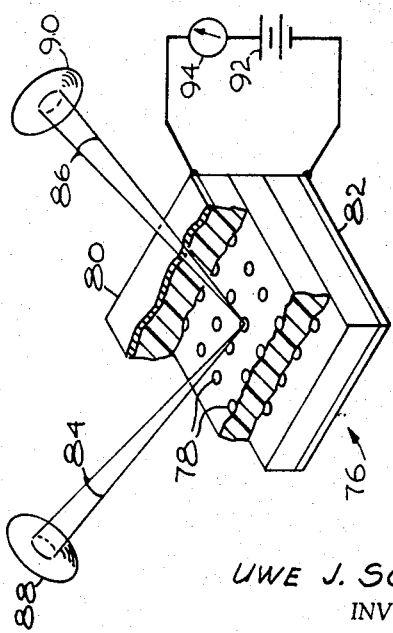
UWE J. SCHMIDT
INVENTOR.
BY Allen M. Sutton
ATTORNEY

United States Patent Office 3,410,624
Patented Nov. 12, 1968

3,410,624
THREE DIMENSIONAL LIGHT BEAM SCANNER
Uwe J. Schmidt, Tannenweg, Germany, assignor, by mesne assignments, to The Bunker-Ramo Corporation, Stamford, Conn., a corporation of Delaware
Continuation of application Ser. No. 316,943, Oct. 17, 1963. This application Sept. 22, 1967, Ser. No. 671,923
5 Claims. (Cl. 350—150)

ABSTRACT OF THE DISCLOSURE

Apparatus responsive to applied electrical control signals for selectively deflecting a light beam toward any point in a three dimensional target. The apparatus includes cascaded deflecting stages of first and second types. The first stage type includes a switching means for orienting the plane of polarization of an incident beam into either of first and second mutually orthogonal planes and a birefringent means for respectively refracting beams polarized in said first and second planes along different first and second paths. The second stage type includes a similar switching means and a birefringent means exhibiting different first and second focal lengths to an incident beam depending upon its plane of polarization.

---

This application is a continuation of my co-pending application Ser. No. 316,943, filed Oct. 17, 1963, now abandoned entitled "Three Dimensional Light Beam Scanner" and assigned to the same assignee as the present application.

The present invention relates to a novel system for variably deflecting and focusing a light beam. More particularly, the invention is directed to a system wherein a light beam is deflected and focused at preselected points by selectively switching the angular plane polarization orientation of the beam as it passes through a series of birefringent optical elements.

It is known that electron energy levels of certain materials may be changed by radiating the material with light of a particular frequency or frequencies. Furthermore, if a beam of light is focused at a point in the material, the electron energy level of the material at that point may be raised without affecting the energy level at other points in the material. This phenomenon may be utilized to provide an information storage device, wherein the electron energy levels at various points in the material represent the storage of binary bits of information. In such a device, information may be retrieved by noting the change or lack of change of the electron energy levels at the various storage points as they are scanned by another beam of light.

In order to provide maximum storage capability, the storage points or positions should be three-dimensionally located in the storage material. This requires either that multiple light sources be provided, or that a single light source be provided which embodies means for deflecting a light beam in two dimensions along with focusing means whose focal length may be varied to provide a third storage dimension. Of course, it is desirable to reduce the number of light sources needed without limiting the number of positions within the memory that may be optically controlled, the optimum condition being attained with a single light source generating a light beam which is electronically deflected to all the desired memory positions so that information may be stored therein and retrieved therefrom.

Conventionally, light beams have been mechanically deflected through the use of rotating or oscillating mirrors or prisms or movable lenses, wherein the speed and accuracy of deflection are limited by the mechanical apparatus employed in the switching operation. However, higher speeds of switching operation may be attained by eliminating all mechanical limitations and resorting to electronic optical switching as described hereafter.

It is a primary object of the present invention to obviate the foregoing disadvantages and to provide an extremely fast light beam switching system for deflecting a single light beam to predetermined focal positions.

Another object is to provide a system which is capable of highly accurate, repeatable performance.

Another object is to provide a system for electronically varying the focusing points of a deflected light beam for positioning the focal point of the beam in three dimensions.

Briefly, the system of the invention takes advantage of the birefringent characteristics of anisotropic materials, whereby different refractive indices of uniaxial prisms and different focal lengths of uniaxial lenses cause a plane polarized light beam to be deflected and focused at predetermined positions, depending on the orientation of the plane of polarization of the beam. Background information on the optical properties of anisotropic media may be found on pages 280 to 306 of a textbook entitled Optics by Bruno Rossi, published by the Addison Wesley Publishing Co., Inc., Reading, Mass. (Library of Congress Catalog Card No. 57-6520). It has been found that in some anisotropic materials there are relatively great differences in the refractive indices for different directions of propagation and polarization of light transmitted therethrough. This phenomenon may be utilized in the practice of the present invention by passing a plane polarized light beam through a uniaxial crystal having birefringent properties (double refractive properties), and, by changing the angle of the plane of polarization of the beam, advantage is taken of the two refractive indices of such a crystal to thereby accomplish the desired light beam deflection.

In one embodiment of the present invention, a prism is made from a uniaxial birefringent material with its optic axis parallel to the apex. The refractive indices along the optic axis are the same for all planes of polarization of incident light, double refraction not being present. However, when a light beam is projected through the prism in a direction normal to the optic axis, and the light is polarized in a plane parallel to the apex of prism, i.e., parallel to the optic axis, the light beam will be deflected through a certain angle, whereas it will be deflected through a different angle for the direction of polarization perpendicular to the optic axis. This state of polarization of the light beam can be switched electronically from the parallel to the perpendicular plane and vice versa by a polarization switch, such as a Kerr cell, to thereby cause deflection of the beam from one position to another.

This type of light beam deflector is particularly useful in that the command for the actuation of the switching can be applied in digital form. Minor instabilities of voltages feeding the polarizing switches do not influence the direction of deflection unless they are great enough to change the state of polarization. The deflection angles are determined by the apex angles and indices of refraction of the prisms used, by the mechanical alignment of the prisms, and by the polarization state of the switches themselves. It is possible to deflect the light beam through $2^N$ number of different angles in one dimension, where N is the number of prisms and polarization switch combinations or units in the path of the light beam. A second dimension at right angles to the first can be added if alternate units of the apparatus are rotated 90 degrees about the axis of the system.

The birefringent properties of uniaxial crystals may further be utilized in varying the focal point of the deflected light beam so that the beam, which may be deflected to $2^N$ positions in two dimensions as previously described, may further be focused at different focal points in each of the deflected positions, so that a focused beam may be positioned in any predetermined point with respect to preselected spatial coordinates.

The variable focusing of the light beam is accomplished by cutting the uniaxial crystal in lens form with the crystal optic axis perpendicular to the lens axis. Such a lens exhibits two different focal lengths which are dependent on the directional orientation of a plane polarized beam of light passing through the lens.

By first passing the plane polarized beam through a polarization switch, such as a Kerr cell, so that the directional orientation of the plane of polarization of the plane polarized beam may be controlled, it is possible to focus the beam at either of two different focal points of the uniaxial crystal lens.

In another embodiment of the present invention, several polarization switch-crystal lens combinations are used so that the beam may be focused at more than two focal points, the number of focal points being equal to $2^M$, where M represents the number of polarization switch-crystal lens combinations. The polarization switches may be electronically controlled so that any focusing position may be speedily attained by properly switching the respective switches for the desired focal point.

For a better understanding of the invention, reference is made to the following description, taken in conjunction with the accompanying drawings, wherein:

FIG. 1(a) diagrammatically illustrates a beam of light passing through a uniaxial crystal having birefringent properties;

FIG. 1(b) diagrammatically illustrates a beam of light passing through a liquid medium and a uniaxial crystal having birefringent properties;

FIG. 2 diagrammatically illustrates one basic principle of the invention;

FIG. 5 is a diagrammatic illustration of another embodiment of the invention;

FIGS. 6(a) and 6(b) are diagrammatic representations of birefringent lenses and isotropic material combinations that may be embodied in the present invention;

FIG. 7 is a diagrammatic illustration of a high density information storage device used in connection with the deflecting and focusing techniques of the invention;

FIG. 8 is a diagram useful in understanding the principles underlying the operation of the storage device of FIG. 7;

FIG. 9 is a diagrammatic illustration of a display device with which the invention may be used; and FIG. 10 is a diagram useful in understanding the operation of the device shown in FIG. 9.

Figure 1A:
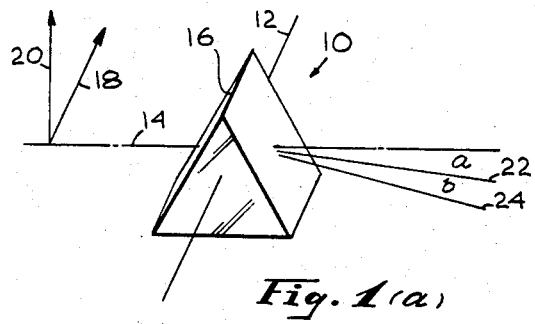

Referring now to FIG. 1(a), there is shown a prism 10 made of uniaxial birefringent material, with its optic axis 12 normal to a path of a light beam 14. An example of such material is calcite, which has a single optic axis along which the refractive index is the same for all planes of polarization of incident light and no double refraction is present. The optic axis 12 is shown to be substantially parallel to an apex 16 of the prism 10. When a monochromatic light beam, which is either plane polarized or vertically polarized, is projected along the path 14 and passes through the prism 10 in a direction substantially normal to the optic axis 12, it is found that the emerging light may be refracted by the prism by different amounts, a horizontally plane polarized beam being deflected by an angle "a" and the vertically plane polarized beam being deflected by an angle "b." While the angle "b" is shown as being larger than the angle "a," the condition may be reversed, depending upon the type of material used for the prism.

Thus, it follows that if monochromatic light is plane polarized either vertically or horizontally before it enters the prism 10, it will be deflected by the prism by one of two different degrees, depending upon the directional orientation of its plane of polarization. For example, if the light entering the prism is horizontally polarized in a plane parallel to the optic axis, as represented by the arrow 18, it may follow path 22 upon emerging from the prism, whereas, if it is vertically polarized perpendicular to the optic axis, as represented by the arrow 20, it may emerge from the prism along a path 24. As the plane of polarization of a light beam is switched from vertical to horizontal, the beam changes its direction from that indicated by path 24 to that of path 22, and, when the plane of polarization is again changed back to vertical, the beam moves from path 22 back to path 24. In this manner the beam is switched between the two directions. The exact directions of deflection are determined by the apex angle "c" of the prism, the two indices of refraction of the uniaxial birefringent material and that of the surrounding medium.

Figure 1B:
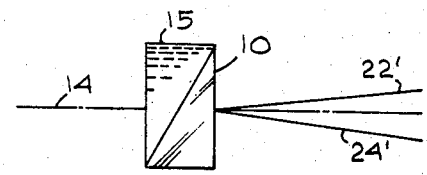

As shown in FIG. 1(b), the prism 10 may be combined with a liquid medium 15 having an index of refraction whose value is substantially midway between the indices of refraction of the crystal. Thus, the combination of the liquid and prism will deflect the plane polarized components of an incident monochromatic light beam 14 along lines 22' and 24' which are symmetrical with respect to the direction of incidence of the light beam. For example, a prism made of calcite having indices of refraction of 1.658 and 1.486 for horizontally and vertically plane polarized monochromatic light (sodium lines), respectively, may be combined with O-tuluidine having an index of refraction of 1.572, so that the emerging polarized beams are symmetrically deflected with respect to the direction of incidence of the monochromatic light beam 14.

Figure 2:
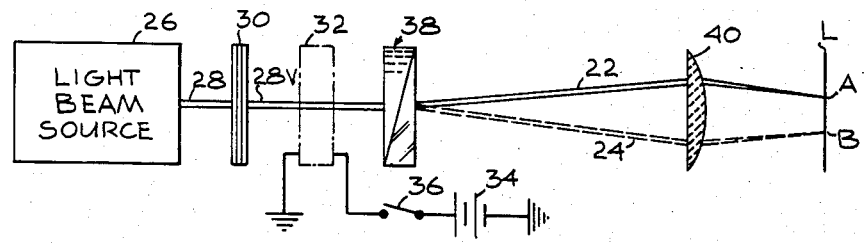

Referring now to FIG. 2, there is shown a conventional source 26 of monochromatic collimated light, which may be a laser or other collimated point source of light, for sending a beam of light 28 through a polarization filter 30, assumed here for explanatory purposes only as passing a light beam that is polarized in a vertical plane. The vertically plane polarized beam 28v is then passed through a polarization switch 32 which, when energized, rotates the plane of polarization of the beam by 90°. A battery 34 and a switch 36 are shown to illustrate a means for energizing the polarization switch 32, one form of which is a Kerr cell. Such a cell may consist of a container filled with nitrobenzene or comparable substance, which is actuatable by the application of a predetermined potential thereacross. Of course, other polarization switching devices, such as ferroelectric or semiconducting materials, may be used.

A prism unit 38, comprising a prism of uniaxial birefringent material together with a selected liquid medium having an index of refraction midway between the two indices of the birefringent prism, is positioned in the path of the beam after it has passed through the polarization switch 32. In light of the characteristics of birefringent material previously discussed, it is apparent that the beam entering the liquid prism unit 38 will be deflected along paths 22 or 24, depending upon the directional orientation of the plane of polarization of the plane polarized beam entering the unit 38, such directional orientation being controllable by the polarization switch 32. Thus, assuming that the switch 32 is open, the beam 28v from the polarization filter 30 will enter the prism unit 38 with a vertically plane polarized orientation, and will thus be deflected along path 22. However, by closing switch 36, the plane of polarization of the beam 28v is rotated by 90 degrees, so that the beam entering the prism unit 38 is horizontally plane polarized and will be deflected along path 24. It should be noted that in order for the switch 32 to rotate the direction of polarization of a beam passing therethrough by 90 degrees, it has to be energized by a switching voltage which is a function of the particular switch used such as the Kerr cell referred to above. However, in systems where the degree of accuracy is not critical, some switching voltage variations may be tolerated without materially affecting the over-all performance of such systems.

Again referring to FIG. 2, the beams 22 and 24 pass through a conventional positive lens 40 which causes the beams to be focused at points A and B, respectively, the points being on a line L which is displaced from the lens 40 by a distance substantially equal to the focal length of the lens.

Figure 3:
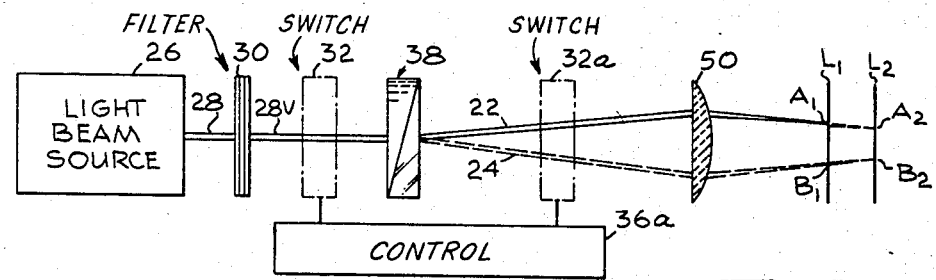
FIG. 3 is a diagrammatic illustration of one embodiment of the invention.

In another embodiment of the present invention shown in FIG. 3, the conventional lens 40 previously described is replaced by a polarization switch 32a identical to polarization switch 32, and a special lens 50. The lens 50 is ground from a uniaxial birefringent crystal, with the optic axis of the crystal being perpendicular to the lens axis. Such a lens effectively exhibits two distinct focal lengths which depend on whether a beam of light traversing the lens is plane polarized in a direction parallel or perpendicular to the optic axis of the crystal. By first passing the plane polarized beams 22 or 24 of FIG. 3 through the polarization switch 32a, the orientation of the planes of polarization of the beams may thereby be controlled, so that the beams 22 or 24 may be focused at points $A_1$ or $A_2$ and $B_1$ and $B_2$, respectively. The points $A_1$ and $B_1$ lie on line $L_1$ which is displaced from the lens 50 by a distance equal to one of the focal lengths of the lens, while $A_2$ and $B_2$ are points on line $L_2$ which lies a distance from the lens equal to the other focal length thereof. The polarization switches 32 and 32a are connected to a control switch 36a, which may operate either mechanically or electronically to individually control the energization or deenergization of the polarization switches.

Figure 4:
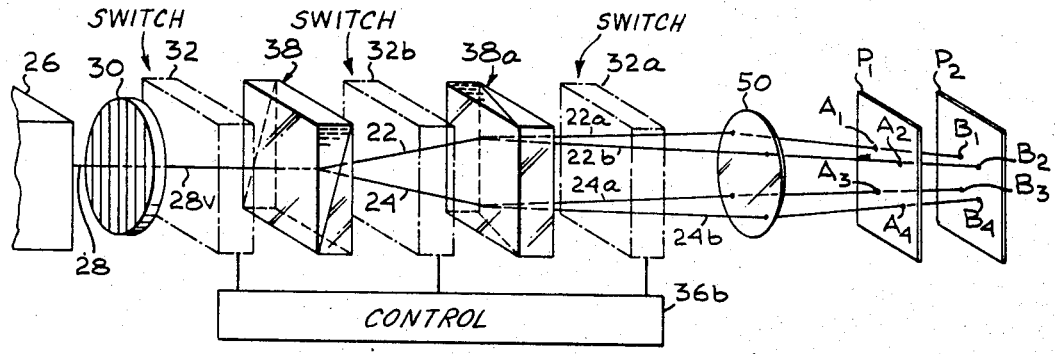
FIG. 4 is a diagrammatic illustration of another embodiment of the invention.

Reference is now made to FIG. 4, which shows another embodiment of the present invention wherein the system previously described further incorporates an additional polarization switch 32b and a prism unit 38a. The switch 32b is identical to polarization switches 32 and 32a and the prism unit 38a is similar to the prism unit 38 except that the prisms in the units 38 and 38a are oriented in the system with their optic axes perpendicular to each other. Thus, the beams are symmetrically deflected with respect to two perpendicular directions. As shown in FIG. 4, beam 28v is deflected symmetrically with respect to a plane perpendicular to the plane of the drawing by prism unit 38, while prism unit 38a deflects the beams 22 or 24 in directions 22a or 22b, 24a or 24b, respectively. The beam directions 22a and 22b or 24a and 24b are symmetrical with respect to a plane parallel to the plane of the drawing. As shown in FIG. 4, any one of the beams 22a, 22b, 24a, or 24b passes through polarization switch 32a and lens 40 which focuses, as previously explained, the beams at $A_1$ or $B_1$, $A_2$ or $B_2$, $A_3$ or $B_3$, and $A_4$ or $B_4$, respectively. The polarization switches are connected to a master switch 36b which may operate either mechanically or electronically to individually control the states of energization of polarization switches 32, 32a, and 32b, thereby controlling the position to which the light beam 28v may be deflected and focused on planes $P_1$ and $P_2$.

In still another embodiment of the present invention, two polarization switches and two positive lenses similar to lens 50 previously described are incorporated, as shown in FIG. 5. In light of the foregoing explanation, it is evident that the beam 22a, passing through polarization switch 32a, lens 50, polarization switch 32c, and lens 50a, may be focused at either point $A_1$, $B_1$, $C_1$, or $D_1$ on planes $P_1$, $P_2$, $P_3$, or $P_4$, respectively, the selected point of focusing being controlled by the state of energization of polarization switches 32a and 32c, which is in turn controlled by master switch 36b. Similarly, each of beams 22a, 22b, 24a, and 24b may be positioned at any one of four points, as shown in FIG. 5.

It will be understood that in the present invention the direction of the path of emergence from the switchable deflecting means at a given time may be any direction as determined by the effective combination of elements in the optical system at that time. Hence the incoming beam to the switchable lens may have any angle including zero with respect to the axis of the equipment.

The foregoing description of the present invention makes it apparent that the number of points at which a beam may be focused depends on the number of combinations of polarization switch-prism units and the number of combinations of polarization switch-prism units and the number of combinations of polarization switch and positive lenses, assuming that all of the prisms and lenses are made of birefringent material. For example, by incorporating N prism combinations and M lenses, a beam may be focused at $2^{(M+N)}$ points, all the points being displaced with respect to one another in a pre-determined three-dimensional configuration.

In all of the previously described embodiments of the invention, the focusing lenses are represented as planoconvex. However, it is apparent that any of the deflected beams may be focused by employing compound lenses to reduce aberrations in accordance with well known optical design principles. For example, the inherent aberrations in the birefringent plano-convex lens 50 (FIG. 4) may be reduced by cementing the lens to a mating plano-concave lens 60 as shown in FIG. 6(a). The lens 60 is cut from isotropic material such as glass and has a refractive index close to those of the birefringent lens 50. The lens 50 may be replaced by a compound lens comprising a birefringent plano-concave lens 55 cemented to a matched isotropic plano-convex lens 65, as shown in FIG. 6(b). By so combining the birefringent lenses with mating lenses, the aberrations present in the collimating part of the system are minimized, thereby greatly increasing the focusing accuracy of the system.

Reference is now made to FIG. 7, which shows how the three-dimensional positioning and focusing of a light beam may be used to store and retrieve information from a high density infrmation storage device. This device consists of a semiconductor material 76 that has been appropriately doped with impurities 78 to create traps which serve as storage elements. The semiconductor material 76 is coated on one surface with a transparent conductive film 80 and on the other surface with a conductive substrate 82. A pair of beams of light, 84, 86 of predetermined frequencies and of appropriate combined intensity at their focal points "write" information through the transparent film 80 and into the memory at a predetermined depth when directed thereto by their respective beam positioning and beam focusing apparatus, represented symbolically in FIG. 7 by lenses 88, 90. The writing of information into the memory is done by filling the impurity traps with electrons that have been excited by the "write" beams. Combined beams of other frequencies and of appropriate combined intensity at their focal points are scanned over the film to "read" the memory. This is done by the absorption of sufficient energy from the "read" beams by the trapped electrons to liberate them. The writing and reading of information will be more fully explained hereinafter with reference to FIG. 7. The electrons liberated by the "read" beams increase the conductivity of the semiconductor material 76. This state may be detected by using the material as a dielectric, which with plates 80, 82 form a charged capacitor. A battery 92 is shown as a charging source and the voltage across the capacitor is sensed by a detecting instrument 94, which may be a high impedance detector, for example, whose output may be coordinated with the position of the reading light beams on the memory. The detection of the liberation of trapped electrons may also be accomplished by other suitable devices, such as photocells, which sense absorption of the light beams by the material or which sense the emission of energy as the electrons are released.

FIG. 8 is an energy level diagram useful in explaining how energy levels are used in the writing and reading of information from an information storage memory such as that described in connection with FIG. 7. Here the electron energy level increases in the direction of arrow E, with electrons in the valence band having a lower energy level than electrons in the conduction band. The valence band represents a zero energy level of the atoms of the material. This is the state at which the atoms will remain in the absence of some external force. The conduction band represents a high energy level, and electrons in this band add to the conductivity of the material. Between these energy bands is a forbidden energy gap in which the electrons do not stay. If enough energy is absorbed, they will be carried up into the conduction band, and, if not, they will fall back to the valence band. Within this forbidden energy gap are impurities known as electron traps. These traps retain electrons at their respective energy levels after the excitation source has been removed. By illuminating a given area of the material with light of the proper frequency, electrons from the valence band will be excited to these levels and be trapped. Thus, information is written or stored in the memory by means of light beams 84 and 86. In writing or storing information in the memory material, the light beams are beamed onto the desired position. These light beams are of such frequencies and intensities that energy of a value of $V_1$ electron volts is absorbed by the electrons in the semi-conductor material. Reading beams of frequencies and intensities sufficient to give the electrons an additional potential $V_2$ lift the electrons from the traps to the conduction band, where they are free to move under the influence of an applied electric field, thereby changing the conductivity of the material. Electrons raised to the conduction band fall back to the valence band again, emitting energy of $V_3$ electron volts. This emission of energy may be detected, or the absorption of $V_2$ electron volts of the reading beam energy may be detected, by suitable photo detectors as alternate detection means to conductivity change detectors.

It should be noted that the potential $V_2$ required to raise the electrons from the donor traps to the conduction band is less than that potential $V_1$ required to raise the electrons from the valence band to the donor traps. If the potential $V_2$ were equal to or greater than potential $V_1$, in addition to raising the electrons from the donor traps to the conduction band, the light used in reading out stored information would also be storing false information by raising the energy levels of additional electrons from the valence band to the electron traps.

Referring now to FIG. 9, there is shown a container 96 having mercury vapor therein under about on micron of mercury pressure at room temperature. A few millimeters of mercury pressure of nitrogen gas may be added to improve the phenomenon of the display, as will hereinafter be discussed. At least two surfaces of container 96 are preferably transparent to light beams 98, 100, which are focused within the container by suitable light beam deflection and focusing apparatus, shown symbolically by lens 102 and lens 104. These two systems preferably are at right angles to each other so that the beams can be more easily made to intersect at any predetermined position within the container. If beam 98 is ultraviolet light having a wavelength on the order of 2536 Angstroms and beam 100 is a blue light having a wavelength on the order of 4047 Angstroms, at their point of intersection 106 will appear a green spot of light having a wavelength on the order of 5460 Angstroms. A suitable interference filter 108 will permit viewing of the green spot emission while filtering out the ultraviolet beam to prevent harmful exposure of the observer.

The energy level diagram shown in FIG. 10 is helpful in explaining the operation of the display which may be generated by the apparatus shown in FIG. 9. The energy level diagram is such that the energy levels increase in electron energy in the direction of the arrow $F_e$. The normal or unexcited state is shown as $A_e$. Ultraviolet light excites the electrons in the mercury vapor to energy level $B_e$, which is not a stable level, and most of the electrons fall back to level $A_e$ in the absence of further excitation. However, it has been found that, when nitrogen has been added to the mercury vapor, the nitrogen absorbs some of the energy to permit a change to a somewhat lower energy level $C_e$. This energy level is metastable and is longer lasting in its retention of electrons. A blue light will excite the electrons from energy level $C_e$ to energy level $D_e$ at which they have a very short lifetime (on the order of $10^{-7}$ seconds) and from which they then drop to energy level $E_e$. It is the drop to this energy level that causes the green light to be emitted. The electrons at the energy level $E_e$ reradiate energy mostly in the form of heat and some ultraviolet light that is not detectable through the interference filter 108 in FIG. 9. The decay and release of energy are shown by the wavy arrow as the electrons drop from energy level $E_e$ back to energy level $A_e$.

From the foregoing explanation, it thus becomes apparent that the points of intersection of the two beams may be controlled by the two-dimensional scanning or deflection of each beam, and each beam may be focused so that the beam focal points are at the points of intersection of the beams to thus control the size of the point of light beam intersection. With suitable switching and scanning of the beams, three-dimensional displays may be generated, with the light beams being positioned at such speeds that the entire display thus generated will be seen by the observer through the interference filter 108.

From the foregoing description, it is now apparent that the present invention provides a system for focusing a light beam at any of a plurality of points positioned in three-dimensional relationship. Advantage is taken of the optical properties of birefringent material which, when made into prisms and lenses, is capable of deflecting and focusing a light beam at different points as a function of the plane of polarization of the light beam passing through each birefringent prism and lens.

Though the invention has been described with particular reference to certain specific applications and embodiments thereof, it will be understood that the invention may be embodied in many other forms. It is therefore to be understood that the invention is not limited to the specific embodiments which have been described, but that various changes, which will now suggest themselves to those skilled in the art, may be made in the material, configuration, details of construction, arrangement of the elements, and applications thereof, without departing from the true spirit and scope of the invention.

The embodiments of the invention in which an exclusive property or privilege is claimed are defined as follows:

1. A system for focusing a beam of light at any one of a plurality of points spaced apart with respect to one another, comprising:
   first means for producing a collimated monochromatic light beam;
   second means for plane-polarizing said light beams with a predetermined directional orientation;
   first polarization switching means acting on said light beam subsequent to said second means for selectively changing the plane of polarization of said light beam between a first directional orientation and a second directional orientation substantially orthogonal thereto;
   deflecting means made of birefringent material and placed in the path of said light beam subsequent to said first polarization switching means with the optic axis of said material substantially perpendicular to said path, said material having different indices of refraction for plane-polarized light passing therethrough with different directional orientations of its plane of polarization, said deflecting means refracting said light beam differently so as to cause the deflection thereof to be different when the plane of polarization of said beam is switched by said first polarization switching means between said first and second directional orientations;

second polarization switching means acting on said light beam subsequent to said second means for selectively changing the plane of polarization of said light beam between a first directional orientation and said second directional orientation substantially orthogonal thereto; and focusing means of birefringent material placed in the path of said plane-polarized light beam subsequent to said second polarization switch means and exhibiting different focal lengths when focusing plane-polarized light of different directional orientations for focusing said light beam deflected in different directions at different focal points when the plane of polarization of said light beam is switched by said second polarization switching means between said first and second directional orientations;

said first polarization switching means, said deflecting means, said second polarization switching means, and said focusing means all being aligned along a common optical axis.

2. The system defined by claim 1 wherein each of said first and second polarization switching means comprises a Kerr cell electronically controllable to switch the plane of polarization of said light beam between said first and second directional orientations.

3. The system defined by claim 1 wherein said deflecting means further comprise a medium having a refractive index substantially midway between the different indices of refraction of said birefringent material so that the beam is substantially deflected in directions symmetrical about the direction of said light beam before passing through said deflecting means.

4. A light beam deflection system for interposition between a source of a beam of plane polarized light and a target to deflect the beam to a selected position in the target, comprising:

a plurality of aligned cascaded beam deflecting stages of first and second types;

said first stage type having in the order of the incoming beam of light a first switching means for rotating the plane of polarization of the beam of light transmitted therethrough into first and second mutually orthogonal planes;

a first birefringent means for refracting light incident thereon polarized in said first and second planes respectively along first and second paths lying in a common plane;

said second stage type having in the order of the incoming beam of light a second switching means for rotating the plane of polarization of the beam of light transmitted therethrough into first and second mutually orthogonal planes; and a second birefringent means exhibiting different first and second focal lengths to the beam dependent on the plane of polarization thereof.

5. In combination:

a source providing a substantially collimated light beam polarized in a single plane;

a plurality of light sensitive means;

means providing control signals selecting one of said plurality of light sensitive means; and deflecting apparatus responsive to said control signals for deflecting said light beam to the one of said plurality of light sensitive means selected by said control signals;

said deflection apparatus including a plurality of first and second stages fixedly disposed in series between said source providing said light beam and said light sensitive means;

each of said first stages including a first polarization rotating means and a first birefringent means with said first polarization rotating means being located closer to said source;

each of said second stages including a first polarization rotating means and a second birefringent means with said first polarization rotating means being located closer to said source;

each of said first polarization rotating means being responsive to said control signals for selectively rotating the plane of polarization of a polarized light beam incident thereon by 90° from a first to a second plane;

each of said first birefringent means refracting light incident thereon polarized in said first and second planes respectively along first and second paths lying in a common plane and each of said second birefringent means focusing light transmitted therethrough polarized in said first and second planes respectively at first and second focal lengths therefrom.

No references cited.

DAVID SCHONBERG, Primary Examiner.

R. J. STERN, Assistant Examiner.